United States Patent [19]

Wilcock

[11] Patent Number: 5,694,971
[45] Date of Patent: Dec. 9, 1997

[54] LEAD-FREE SADDLE VALVE FOR TAPPING INTO FLUID LINES

[76] Inventor: Anthony C. Wilcock, 13 358 Valley Vista Blvd., Sherman Oaks, Calif. 91423

[21] Appl. No.: 651,113

[22] Filed: May 21, 1996

[51] Int. Cl.⁶ .................. B23B 41/08; F16L 41/06; F16K 43/00
[52] U.S. Cl. .................. 137/318; 30/96; 222/91; 251/215; 251/900; 408/87; 408/102; 408/137
[58] Field of Search .................. 137/318; 222/5, 222/83, 91; 30/92, 95, 96; 251/205, 208, 215, 223, 225; 285/197, 198, 199; 408/87, 137, 102, 138

[56] References Cited

U.S. PATENT DOCUMENTS

| | | |
|---|---|---|
| 2,669,415 | 2/1954 | Gilroy .................. 251/215 |
| 2,875,777 | 3/1959 | Lacart .................. 137/318 |
| 3,038,490 | 6/1962 | Yocum .................. 137/318 |
| 3,336,937 | 8/1967 | Ehrens et al. .................. 137/318 |
| 3,495,615 | 2/1970 | Ehrens et al. .................. 137/318 |
| 3,557,833 | 1/1971 | Gilmont .................. 251/205 |
| 3,788,345 | 1/1974 | Tura .................. 137/318 |
| 3,973,584 | 8/1976 | McKinnon .................. 137/318 |
| 4,598,731 | 7/1986 | Colson .................. 137/318 |
| 4,809,735 | 3/1989 | Volgstadt et al. .................. 137/318 |
| 5,393,035 | 2/1995 | Steele .................. 251/205 |

*Primary Examiner*—George L. Walton
*Attorney, Agent, or Firm*—William H. Maxwell

[57] ABSTRACT

A lead free water valve for domestic use as a saddle valve for tapping into existent water supply tubes to establish a permanent retrofit installation for controlled water service to a lateral installation, having a set screw affixing the saddle to the supply tube and having a retainer assembly by which a single non-removable fastener secures an operating knob that captures a retainment collar, and micrometer adjustment with port opening indication.

20 Claims, 3 Drawing Sheets

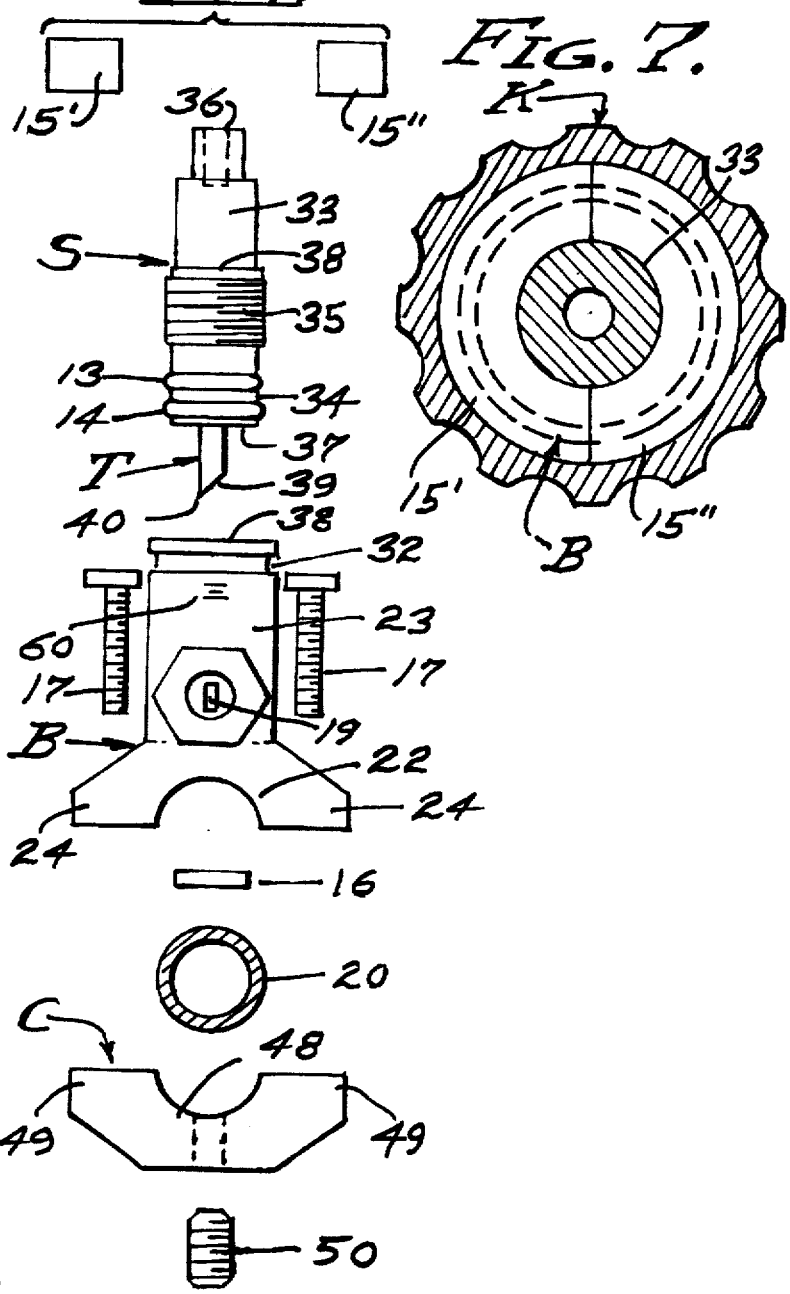

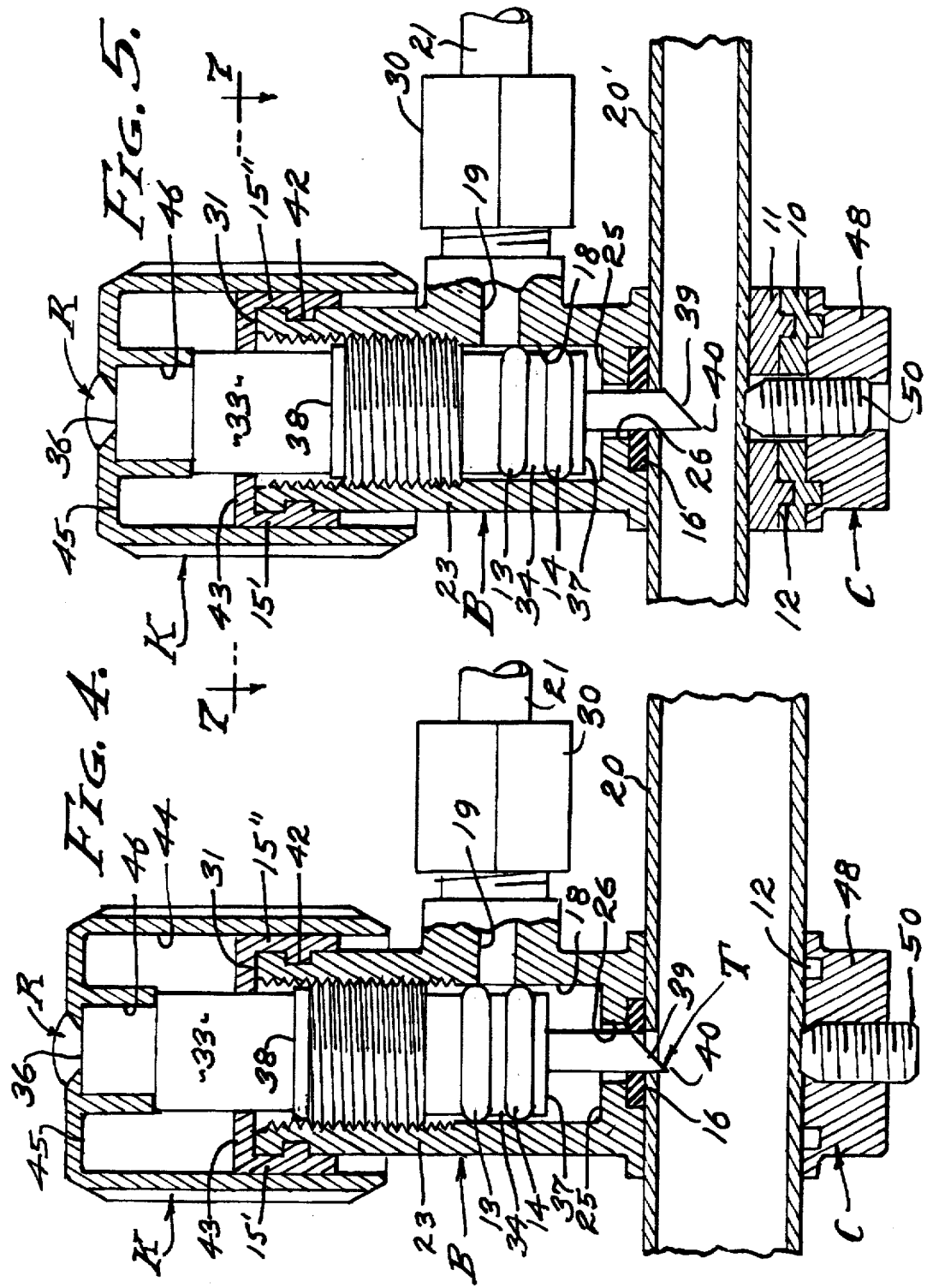

LEAD-FREE SADDLE VALVE FOR TAPPING INTO FLUID LINES

BACKGROUND OF THE INVENTION

This invention relates to valves for tapping into pressured fluid lines, for example a water line to which a purifier or the like is to be attached. It is tubing to which this saddle valve is applied, in order to draw off water that is routed through a filter unit (not shown). The water supply piping to a sink or like basin is conventionally comprised of copper tubing or like extruded material which is soft and readily cut or drilled into, it being a general object of this invention to make a lateral fluid connection into such a water supply tubing. However, it is a retrofit installation that is to be made, without disturbing the existent plumbing or piping. That is, removal or cutting into the plumbing or piping is avoided, there being no insertion of additional fittings which characterize such plumbing or piping. On the contrary, it is an external application to the tubing serving a sink or the like.

Fittings of the type under consideration are referred to in the Art as "Saddle Valves", which serve two basic functions; one to open laterally through the side wall of a water tube under pressure, and one to close and open the lateral opening made thereby. It is normally a one-time installation of the saddle valve that is made, a prescribed procedure being followed. And, it is important that the saddle valve be employed as prescribed without tampering with it, an by disassembly or by inquisitive inspection, all of which often results in subsequent malfunction as a result of improper re-assembly and/or damage to critical parts and members thereof. Accordingly, it is an object of this invention to provide a tamper proof saddle valve assembly that cannot be inquisitively inspected by disassembly. The saddle valve as it is herein disclosed can only be installed as prescribed, and it is not subject to malfunctions when the proper installation procedure is followed.

The saddle valve herein disclosed is made tamper proof by employing a non-removable fastener in the form of a barbed rivet that is forcibly installed and cannot be removed without destroying the surrounding structure. It is an object of this invention to employ a single assembly fastener, and to provide a body and retainer assembly held secure by said fastener, preferably said non-removable fastener. The retainer assembly is comprised of a rotatable operating knob that captures a split collar in locked engagement with the body to form a back stop for the single operating member. The single operating member is captured by the retainer assembly and which has the two aforesaid functions of opening through the tubing side wall and to close and open the lateral opening therethrough.

It is still another object of this invention to provide a throttling function and an independent shut OFF seal function. The single operating member is sectional, with an upper manually operated drive section, a lower valve section, and an intermediate feed section, all as later described. A tube engaging trepanning cutter projects from the lower valve section. The characteristic features being the fine thread engagement and micrometer valve adjustement, the forceful advancement of the trepanning tool, and the valve position indicating function from the shut OFF to full ON of the valve.

SUMMARY OF THE INVENTION

A primary object of this invention is to produce a cost effective lead free saddle valve of nontoxic materials. Leaded materials are replaced by composite plastic materials that can be injection molded without machine work. Only the trepanning tool and assembly fasteners are lead free metalic production machine parts. In carrying out this invention, there is a cylinder body member with internally molded threads. The single operating member is an elongated shaft member having externally molded threads, the trepanning tool being a non-toxic metallic part. In accordance with this invention, the retainer assembly is comprised of an operating knob that captures a split collar that locks onto the body member and forms the back stop for the operating member. It is the operating knob that is secured by the single fastener for completing the assembly. A feature is the valve position indicator means in the form of a micrometer adjustment of the valve opening indicated by a graduated scale on the valve body that is visibly exposed by axial movement of the operating knob having one or more index lines. The saddle valve assembly thus far described is complemented by a clamp member that features a set screw and which draws onto or over a section of tubing under fluid pressure, for positioned operation to establish a lateral valve controlled connection.

The foregoing and various other objects and features of this invention will be apparent and fully understood from the following detailed description of the typical preferred forms and applications thereof, throughout which description reference is made to the accompanying drawings.

THE DRAWINGS

FIG. 2 is an exploded view illustrating the basic parts and members of the saddle valve as described herein.

FIG. 4 is an enlarged sectional view of the saddle valve as it is shown in FIG. 1, showing the trepanning function through the top side wall of the tubing.

FIG. 5 is a view similar to FIG. 4, showing the clean-out operation that clears the hole through the tubing side wall.

FIG. 6 is a plan view of the split collar as it appears when closed over the top end of the body member.

And, FIG. 7 is a plan section taken as indicated by line 7—7 on FIG. 5, showing the completed retainer assembly that captures the split collar.

PREFERRED EMBODIMENT

Figure 1:
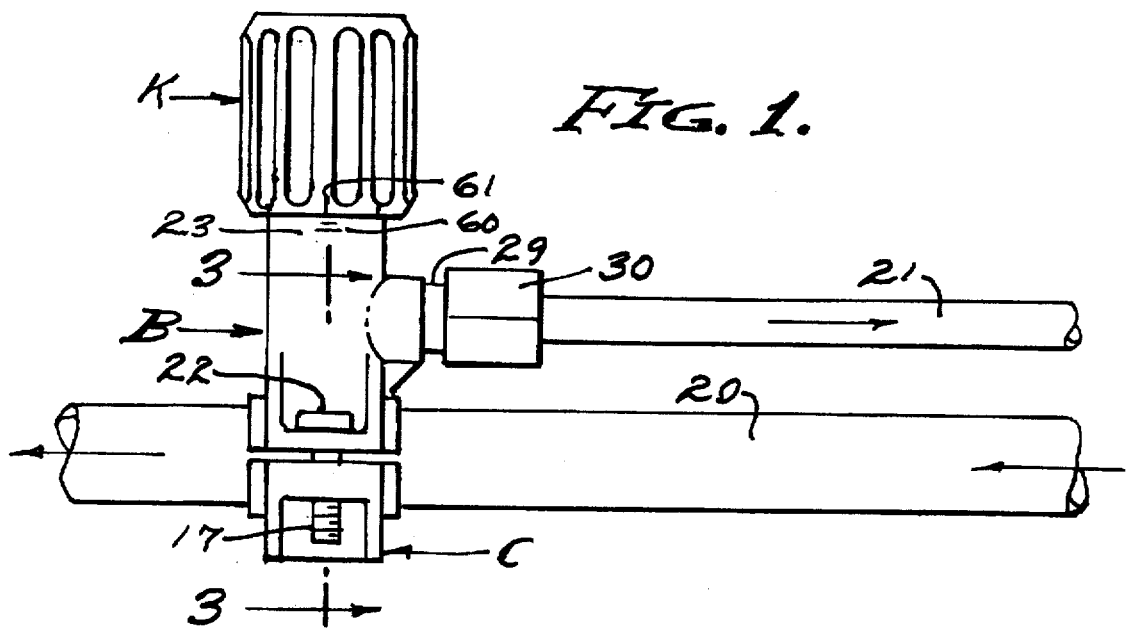
FIG. 1 is a side elevation of a saddle valve installation, by which a lateral valve controlled fluid connection is applied to a section of tubing.
Figure 3:
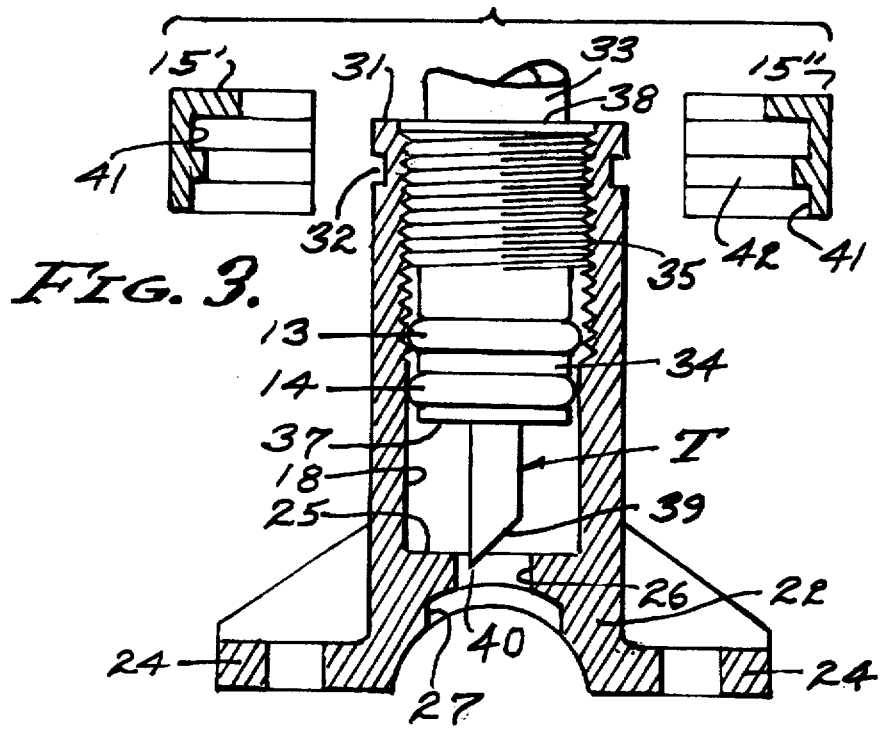
FIG. 3 is an enlarged section taken as indicated by line 3—3 on FIG. 1, and showing the assembly of the body member and the operating member preparatory to receiving the split collar of the reataining assembly.

Referring now to the drawings, the tubing under fluid pressure can vary in diameter, for example from ⅜ inch as shown in FIG. 5 to ⅝ inch as shown in FIGS. 1 and 4, there being an intermediate diameter (not shown). As shown in FIGS. 5, there are two saddle shims 10 and 11 applied to the saddle clamp C to accommodate ⅜ diameter tubing, and shim 10 alone for accommodating ½ inch tubing. Note the pins and sockets 12 for location of the shims. The exploded FIG. 2 view illustrates the relationship of the thirteen basic parts involved and their relative positions prior to assembly. Assembly sequence is preferably as follows: The operating stem S can be molded onto the trepanning tool T or press fitted thereto, while the spaced O-ring seals 13 and 14 are stretched into grooves as shown. The assembled stem S is then threaded into the body member B as shown in FIG. 3, whereupon the split collar 15'-15" is assembled onto the body member as shown in FIGS. 4, 5 and 6. The operating knob K is then keyed onto the stem S and the barbed rivet R driven into place as shown in FIGS. 4 and 5. A tube packing gland 16 is inserted into the saddle as shown in FIG. 4 and 5. This completes the product assembly preparatory to its use, and which is mated with the saddle clamp C that has threaded nuts inserted therein to receive clamp screws 17.

The starting position of the stem S and trepanning tool T is shown in FIG. 3, the completed trepanning cut being shown in FIG. 4, and the punch-through function that cleans out the lateral hole in the wall of the tubing 20 shown in FIG. 5. It is the axial position of the stem S and lower O-ring 14 that has a throttling function as it moves downward over a narrow vertically disposed slot-shaped port 19 through the body member side wall to the position shown in FIG. 4. The seal 13 remains above the port 19 as shown in FIG. 4 to close said port from the lateral take-off service tubing 21.

The body member B is an injection molded part, preferably of glass filled Polypropylene for its stable physical properties and comprised of a saddle portion 22 and a cylinder portion 23. As shown in FIG. 3, the saddle portion 22 is a half cylinder with diametrically opposite flanges 24 faced to oppose complementary flanges of the clamp member C. As shown, the tubing 20 is horizontally disposed, in which case the plane of the flanges 24 is at the axis of said tubing. The axis of the cylinder portion 23 intersects and is perpendicular to said tubing axis, the cylinder bore 18 being closed by a bottom wall 25 through which there is a counterbore 26 with clearance around and for access of the cutting tool T to the tubing wall, also to provide a water passage around said tool and into the cylinder bore 18. A recess 27 surrounds the counterbore 26 and is open to the crowned top side of the tubing 20. A packing gland 16 occupies the recess 27 as shown in FIGS. 4 and 5.

The lower portion of the cylinder bore 18 is smooth walled for sealed engagement with the O-ring seals 13 and 14, and the upper portion of the cylinder bore 18 is threaded for working engagement with the feed section of the stem S, as later described. Intermediate the vertical extent of the lower portion of the cylinder bore 18 there is the lateral port 19 through the side wall of the body member B. The port 19 is spaced above the bottom wall 25 and opens laterally through a threaded nipple 29 to which a gland nut 30 is applied to connect the lateral service tubing 21 (see FIG. 1). The top open end face 31 of the body member B is disposed in a horizontal plane at a right angle to the axis of cylinder bore 18 and which determines the upper STOP position of the operating stem S, and in accordance with this invention, at the exterior of the cylinder body B there is an annular retainer groove 32 for locked engagement with the split collar 15'-15", as will be described (see FIG. 3).

The operating member or stem S is an injection molded part, preferably of Acetol Copolymer (POM) such as Delrin manufactured by DuPont, a sectional part having an upper drive section 33, a lower valve section 34 and an intermediate feed section 35. The stem is an elongated cylindrical solid characterized by its integrally formed sections 33-35, and from which the trepanning cutter tool T projects as clearly shown throughout the drawings. Intermediate the top and bottom ends 36 and 37 of the stem there is an upwardly faced shoulder 38 for stopped engagement with the split ring 15'-15" (see FIG. 3). The upper threaded portion of the cylinder bore 18 terminates above the lateral port 19 and limits the downward travel of the feed section 35 which is the threaded portion of the stem S. In practice, a fine 40 pitch thread is employed for positive downward advancement of the stem S and trepanning cutter tool T carried thereby; and also to retract said tool. Essentally therefore, the threaded engagement of the stem S in the body member B is a feed means that ensures uniform penetration of the cutter tool T through the tubing side wall. It is the feed section 35 that carries the stem S coaxially within the cylinder bore 18.

The lower valve section 34 is of slightly reduced diameter so as to fit with clearance within the bore 18 and with the O-rings 13 and 14 effectively engaged within said bore. Initially, the lowermost O-ring 14 engages the bore 18 immediately above the lateral port 19. As and when the lowermost O-ring 13 opens the lateral port 19 the uppermost O-ring 14 prevents entry of water into the threaded drive section 33. And, said O-rings shut OFF water flow when the cutter tool T moves totally through the tube side wall (see FIG. 5).

The upper drive section 33 is of reduced diameter so as to expose the stop shoulder 38 to the split collar 15' 15" and to rotatably and reciprocably pass therethrough, and preferably with slight clearance. The top end portion of the stem S is polygonal, squared as shown, to have keyed engagement with the manually operable knob K (see FIGS. 4 and 5).

The trepanning cutter tool T is a lead free metalic part of 416 stainless steel of approximately 45 Rockwell and affixed to and projecting from the bottom 37 of the valve section 34 of the stem S and extends with clearance through the counterbore 26 to revolve and move reciprocably therethrough. The cutter tool T is a cylindrical shaft fixed coaxially to the stem S so as to rotate therewith and to advance downwardly as governed by the feed section 35. The cutter tool is advanced incrementally as the stem S is rotated clockwise, and alternately to retract. The active cutter edges are formed by the diagonal truncation of the lower end portion of the cutter tool, preferably 45° at 39 to establish a point 40 and two reversely extending cutting edges. Thus, the end portion of the cutter tool T is tapered, with two cutting edges that progress upwardly 180°, each in a half helix respectively. One cutting edge is active when the cutter tool T is advanced downwardly to cut a hole, and the other cutter edge is active when the cutter tool T is reversely rotated to retract upwardly to clear said hole.

In accordance with this invention, the body member B and operating stem S are assembled as shown in FIG. 3, and the split collars 15'-15" positioned as shown are brought together as shown in FIG. 6. The collars are comprised of semi-circular segments separated along a diametrical plane coincidental with and passing through the central axis of the cylinder bore 18, when assembled. The assembled collar segments establish a cylinder bore 41 that closely receives the outside diameter of the body member B, the top flanges 43 of the collar being positioned by the top plane 38 of the body member. The collar segments are locked axially in position by inwardly disposed rails 42 received in the annular groove 32 of the body member. Said top flange 43 of the split collar provides the upper STOP to limit retraction of the operating stem S. The collar segments 15'-15" are closely fitted and present a right cylinder exterior to rotatably and slideably receive the knob K, next described.

The knob K is an injection molded part, preferably of Butyl Acrylic Styrene (ABS) for its cost effectiveness, that is of inverted cup shape, having a right cylinder bore 44 and a closed header 45 with a downwardly opening socket 46 to receive the polygonal top end portion of the drive section 33 of the stem S. The inner diameter bore of the knob slidably rotates over the cylindrical exterior of the split collar 15'-15" and thereby captures it engaged with the body groove 32.

A single fastener in the form of a barbed rivet R is driven through the header 45 and into the top portion of the stem S, for permanently affixed attachment of the knob to the drive section of the operating stem, thereby precluding disassembly of the entire saddle valve as it is hereinabove described.

The clamp member C is an injection molded part, preferably of glass filled Polypropylene as is the body B, and comprised of a saddle portion 48 complementary to the above described body member B. As shown in FIG. 2, the saddle portion 48 is a half cylinder with diametrically opposite flanges 49 faced to oppose the aforesaid flanges 24 of the body member B, with threaded nuts imbedded therein to receive the clamping screws 17. The shims 10 and 11 are shown in FIG. 5 to accommodate a small diameter 3/8 inch tubing 21', the shims being carried by the clamp member C.

A feature of this saddle valve is the provision of a radial set screw 50 threaded through the clamp member C to engage and fixedly position the tubing both rotatively and longitudinally so that it remains fixed with respect to the saddle valve during the trepanning operation and thereafter.

Another feature of this saddle valve is the micrometer adjustment and display of the valve position. That is, the closed or open position of the valve is displayed to the person operating the valve, by means of graduated scale 60 visible on the body B. As shown, the scale is an axially disposed line on the exterior surface of the cylinder body, preferably engraved therein by molding. The graduations are spaced circumferentially disposed lines intersecting the first mentioned line, and also engraved. In practice, the axial height of the port 19 is, for example 0.125 inch, whereas the axial spacing of the O-rings 13 and 14 is 0.130 inch so as to embrace said port. The 40 pitch thread which is preferred, advances 0.025 inch per turn and requires five turns of the knob K in order to shift the seal 14 from a closed condition to a fully open condition, each turn representing approximately 1/5 flow increase or decrease as may be required. In practice, there are five scale graduations between closed and open. And, the knob K has at least one and preferably eight radial index lines 61 to rotatably position said knob at finite increments along the calibrated scale. Accordingly, the port 19 can be opened clsed and its condition known.

Having described only the preferred forms and applications of my invention, I do not wish to be limited or restricted to the specific details herein set forth, but wish to reserve to myself any modifications or variations that may appear to those skilled in the art as set forth within the limits of the following claims.

I claim:

1. A tamper proof saddle valve for attachment to tubing under fluid pressure and for making a valve controlled fluid connection into a lateral tube, and including;

a body member having a cylinder bore opening upwardly at a top end thereof and on an axis extending from a side wall of the tubing, there being a lateral port opening from the cylinder bore, an operating member carried in the cylinder bore of the body member and having an upper drive section extending from an upwardly faced shoulder, a lower valve section, and a feed section engaged with and to rotate and reciprocate the operating member within the body member, a seal carried by the valve section of the operating member and positioned by reciprocation of the operating member to close and open said lateral port, a cutter tool affixed to and projecting axially from the lower valve section of the operating member to rotate and reciprocate from the cylinder bore of the body member to engage and penetrate the side wall of the tubing, and a retainer assembly comprised of a split collar engaged around a top end portion of the body member and having a flange disposed inwardly over the top end of the body member forming a STOP engaged by the shoulder of the operating member for limited movement and retainment thereof within the cylinder bore of the body member, and an operating knob of inverted cup shape affixed to the upper drive section of the operating member and with a cylindrical bore engaged around and slidably rotatable over and along the split collar for retaining it engaged with the body member.

2. The saddle valve for making a valve controlled fluid connection from a tubing under pressure and into a lateral tube, as set forth in claim 1, wherein the body member is comprised of a saddle portion and a cylinder portion carried thereby, the saddle portion having diametrically opposite flanges complementary to flanges of a clamp member and drawn together over said tubing by fasteners.

3. The saddle valve for making a valve controlled fluid connection from a tubing under pressure and into a lateral tube, as set forth in claim 2, wherein a radial set screw carried by the clamp member engages and fixedly positions the body member on said tubing.

4. The saddle valve for making a valve controlled fluid connection from a tubing under pressure and into a lateral tube, as set forth in claim 1, wherein the split collar of the retainer assembly is comprised of segments assembled forming a right cylinder exterior for sliding engagement with the cylinder bore of the operating knob and having an inwardly disposed rail in locked engagement with an outwardly opening retainment groove in the exterior of the body member.

5. The saddle valve for making a valve controlled fluid connection from a tubing under pressure and into a lateral tube, as set forth in claim 1, wherein the drive section of the operating member is a stem of reduced diameter extending through the split collar and with its top end portion keyed to the operating knob.

6. The saddle valve for making a valve controlled fluid connection from a tubing under pressure and into a lateral tube, as set forth in claim 1, wherein the drive section of the operating member is a stem of reduced diameter extending through the split collar and with its top end portion keyed to the operating knob and affixed thereto by a fastener.

7. The saddle valve for making a valve controlled fluid connection from a tubing under pressure and into a lateral tube, as set forth in claim 1, wherein the drive section of the operating member is a stem of reduced diameter extending through the split collar and with its top end portion keyed to the operating knob and affixed thereto by a non-removable barbed rivet.

8. The saddle valve for making a valve controlled fluid connection from a tubing under pressure and into a lateral tube, as set forth in claim 1, wherein the lower valve section fits with clearance within the cylinder bore of the body member, the seal being positioned below said lateral port when the cutter tool penetrates the tubing.

9. The saddle valve for making a valve controlled fluid connection from a tubing under pressure and into a lateral tube, as set forth in claim 1, wherein the lower valve section fits with clearance within the cylinder bore of the body member, the seal being positioned to open said lateral port when the cutter tool is retracted from the tubing.

10. The saddle valve fox making a valve controlled fluid connection from a tubing under pressure and into a lateral tube, as set forth in claim 1, wherein the lower valve section fits with clearance within the cylinder bore of the body member, there being a seal spaced above the first mentioned seal and positioned in said cylinder bore when the first mentioned seal is open to the lateral port for water flow into the lateral tube.

11. The saddle valve for making a valve controlled fluid connection from a tubing under pressure and into a lateral tube, as set forth in claim 1, wherein the feed section is threadedly engaged within the cylinder bore of the body member and the lower valve section carried thereby with clearance within said cylinder bore.

12. The saddle valve for making a valve controlled fluid connection from a tubing under pressure and into a lateral tube, as set forth in claim 1, wherein the feed section is carried be a fine thread engaged within the cylinder bore of the body member and the lower valve section carried thereby with clearance within said cylinder bore.

13. The saddle valve for making a valve controlled fluid connection from a tubing under pressure and into a lateral tube, as set forth in claim 1, wherein the feed section is carried by a 40 pitch thread enagaged within the cylinder bore of the body member and the lower valve section carried thereby with clearance within said cylinder bore.

14. The saddle valve for making a valve controlled fluid connection from a tubing under pressure and into a lateral tube, as set forth in claim 1, wherein the cutting tool affixed to the lower valve section of the operating member is a cylindrical shaft with a trepanning cutting edge at its lower end portion.

15. The saddle valve for making a valve controlled fluid connection from a tubing under pressure and into a lateral tube, as set forth in claim 1, wherein the cutter tool affixed to the lower valve section of the operating member is a cylindrical shaft with a truncated lower end portion forming a trepanning cutting edge.

16. The saddle valve for making a valve controlled fluid connection from a tubing under pressure and into a lateral tube, as set forth in claim 1, wherein the cutter tool affixed to the lower valve section of the operating member is a cylindrical shaft truncated diagonally and forming reversely extending half helix cutting edges for advancing and retracting cuts.

17. A tamper proof saddle valve for attachment to tubing under fluid pressure and for making a valve controlled fluid connection into a lateral tube, and including;

a body member having a cylindrical exterior and a cylinder bore opening upwardly at a top end thereof and on an axis extending from a side wall of the tubing, there being a lateral port opening from the cylinder bore, an operating member carried in the cylinder bore of the body member and having an upper drive section extending from an upwardly faced choulder, a lower valve section, and a feed section threadedly engaged with and to rotate and reciprocate the operating member within the body member, a seal carried by the valve section of the operating member and positioned by reciprocation of the operating member to close and open said lateral port, a cutter tool affixed to and projecting axially from the lower valve section of the operating member to rotate and reciprocate from the cylinder bore of the body member to engage and penetrate the side wall of the tubing, a retainer assembly comprised of a split collar with a flange engaged around a top end portion of the body member and having a flange disposed inwardly over the top end of the body member forming a STOP engaged by the shoulder of the operating member for its limited movement and retainment within the cylinder bore of the body member, and an operating knob of inverted cup shape affixed to the upper drive section of and to rotate the operating member and with a cylinder bore engaged around and slidably rotatable over and along the split collar for retaining it engaged with the cylindrical body exterior.

18. The saddle valve for making a valve controlled fluid connection from a tubing under pressure and into a lateral tube, as set forth in claim 17, wherein the operating knob has at least one index line indicating its rotative position with respect to the graduated scale line.

19. The saddle valve for making a valve controlled fluid connection from a tubing under pressure and into a lateral tube, as set forth in claim 17, wherein the feed section is carried by a 40 pitch micrometer thread engaged within the cylinder bore of the body member, and wherein the graduated scale has five equally spaced graduation lines between closed and open positions of the port.

20. The saddle valve for making a valve controlled fluid connection from a tubing under pressure and into a lateral tube, as set forth in claim 17, wherein the feed section is carried by a 40 pitch micrometer thread engaged within the cylinder bore of the body member, wherein the graduated scale has five equally spaced graduation lines between closed and open positions of the port, and wherein the operating knob has at least one index line indicating its rotative position with respect to CLOSED, INTTERMEDIATE and OPEN conditions of the port.

* * * * *